United States Patent [19]

Wolf

[11] Patent Number: 4,710,083
[45] Date of Patent: Dec. 1, 1987

[54] NAILING PLATE FOR THE PRODUCTION OF COMPOUND SUPPORTS, AND COMPOUND SUPPORT

[75] Inventor: Johann Wolf, Scharnstein, Austria

[73] Assignee: Johann Wolf Gesellschaft m.b.H. KG, Scharnstein, Austria

[21] Appl. No.: 779,989

[22] Filed: Sep. 24, 1985

[30] Foreign Application Priority Data

| Oct. 29, 1984 | [AT] | Austria | 3428/84 |
| Oct. 29, 1984 | [AT] | Austria | 3429/84 |
| Nov. 15, 1984 | [AT] | Austria | 3624/84 |
| Nov. 15, 1984 | [AT] | Austria | 3625/84 |
| Jul. 3, 1985 | [AT] | Austria | 1977/85 |
| Jul. 8, 1985 | [AT] | Austria | 2021/85 |

[51] Int. Cl.⁴ .................................... F16B 15/00
[52] U.S. Cl. .................................... 411/466; 403/283; 403/405.1; 411/470
[58] Field of Search ............... 411/461, 466–468, 411/470, 457; 403/283, 406.1, 405.1; 52/712, 693, 694, 642

[56] References Cited

U.S. PATENT DOCUMENTS

| 272,685 | 2/1883 | Hart | 411/466 X |
| 352,000 | 11/1886 | Penfold | 411/470 X |
| 705,626 | 7/1902 | Vogel | 411/467 X |
| 808,489 | 12/1905 | Stimpson | 411/461 X |
| 2,782,673 | 2/1957 | Packard | 411/461 |
| 3,479,919 | 11/1969 | Lidsky | . |
| 3,498,171 | 3/1970 | Jureit | 411/466 |
| 3,892,160 | 7/1975 | Jureit et al. | . |
| 3,910,153 | 10/1975 | Jureit | 411/466 |
| 3,951,033 | 4/1976 | Moehlenpah | . |
| 4,165,672 | 8/1979 | Jureit et al. | 411/461 |
| 4,209,265 | 6/1980 | Moehlenpah | . |
| 4,295,318 | 10/1981 | Perlman | 52/693 |
| 4,297,048 | 10/1981 | Jureit et al. | 411/466 X |
| 4,442,649 | 4/1984 | Birckhead et al. | 52/693 |
| 4,475,328 | 10/1984 | Reeder et al. | 52/693 |
| 4,483,120 | 11/1984 | Gottlieb | 52/693 |
| 4,527,933 | 7/1985 | Karhumaki et al. | 403/283 X |

FOREIGN PATENT DOCUMENTS

| 469932 | 12/1928 | Fed. Rep. of Germany | 52/695 |
| 1658870 | 12/1972 | Fed. Rep. of Germany | . |
| 2650181 | 8/1977 | Fed. Rep. of Germany | . |
| 2613522 | 10/1977 | Fed. Rep. of Germany | . |
| 2741533 | 1/1979 | Fed. Rep. of Germany | . |
| 2049543 | 3/1971 | France | . |
| 2501807 | 9/1982 | France | . |
| WO84/00095 | 1/1984 | PCT Int'l Appl. | . |
| 613247 | 9/1979 | Switzerland | . |
| 1090373 | 11/1967 | United Kingdom | 411/466 |
| 1488418 | 10/1977 | United Kingdom | . |

Primary Examiner—Lloyd A. Gall
Attorney, Agent, or Firm—Young & Thompson

[57] ABSTRACT

A compound support consists of two or more beams (5) joined together along their butt joint (4) by means of nailing plates (1). The nailing plates (1) consist of sheet-metal plates (11), tongue-shaped nails (2, 3) being forced out of the sheet-metal plates (11) by means of punchings (21, 31) in a rhomboid-shaped zone.

2 Claims, 5 Drawing Figures

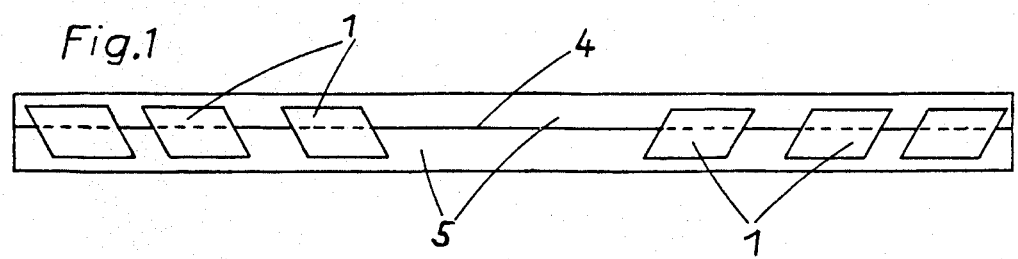
Fig.1
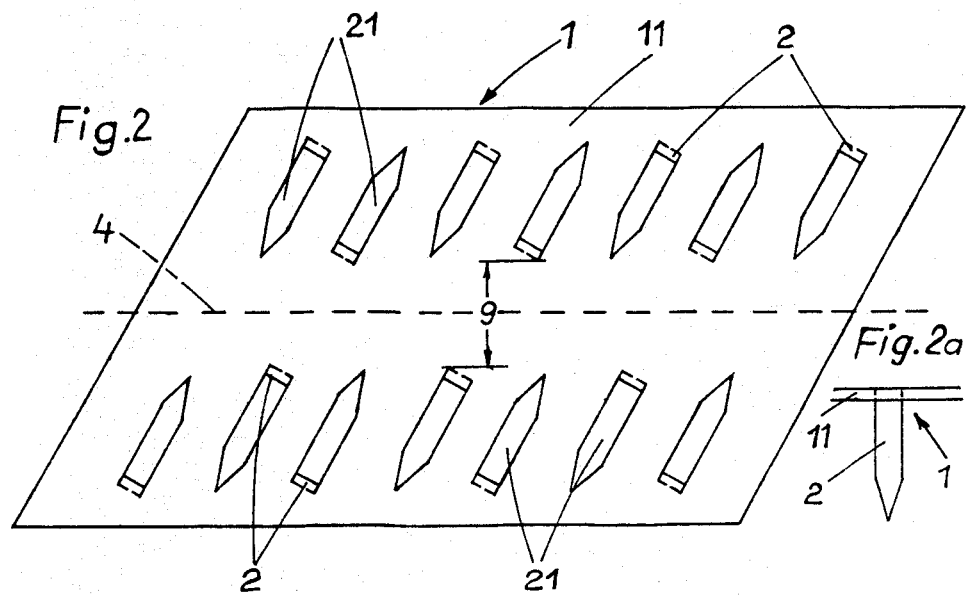
Fig.2
Fig.2a
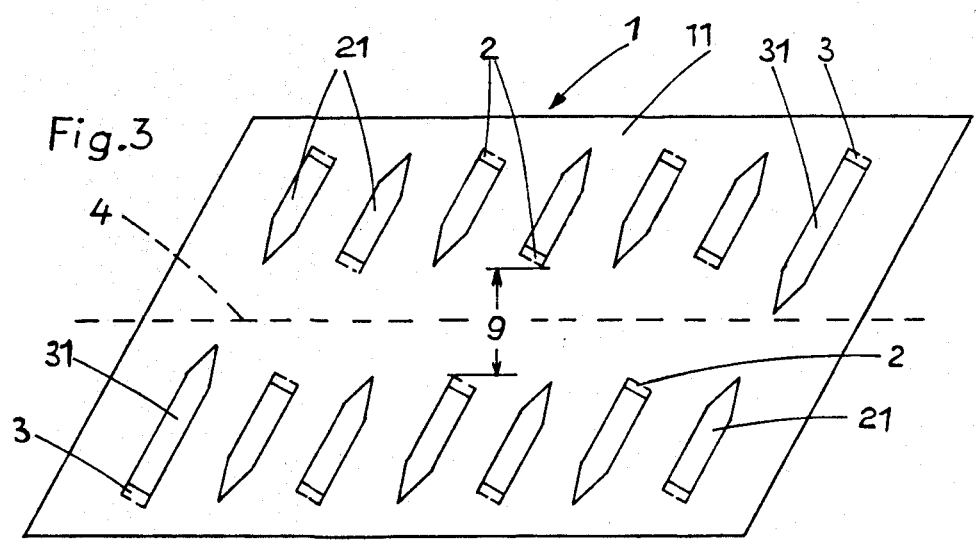
Fig.3
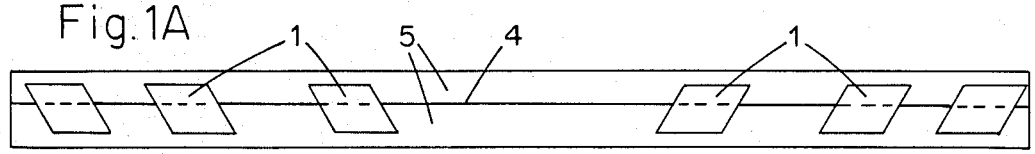
Fig.1A

NAILING PLATE FOR THE PRODUCTION OF COMPOUND SUPPORTS, AND COMPOUND SUPPORT

BACKGROUND OF THE INVENTION

1. Field of the Invention

The invention relates to a nailing plate, consisting of a metal sheet and nails arranged in several rows and formed from tongue-shaped punchings, for the production of compound supports, consisting of two or several beams; and to compound supports produced with nailing plates.

2. Description of the Prior Art

Nailing plates made from sheet-metal plates and from nails formed from tongue-shaped punchings in the sheet-metal plates, and intended for the connection of wooden members, are known in a great variety of versions. In essence, the conventional suggestions concern a special configuration of the nails with respect to their contour shape and their longitudinal section and cross section, to improve anchorage of the nails in the wooden members. Attention is invited to: DAS's No. 1,658,870 and No. 2,741,533; DOS's No. 2,613,522 and No. 2,650,181; U.S. Pat. Nos. 3,479,919 3,892,160, 3,951,033, and 4,209,265; French Pat. Nos. 2,049,543 and 2,501,807; Swiss patent No. 613,247; British Patent No. 1,488,418; and PCT/AU No. 84/00095. All of the known nailing plates generally exhibit a rectangular contour and are intended primarily for joining frame sections.

OBJECTS OF THE INVENTION

The invention is based on the object of providing a nailing plate, with the aid of which the beams of a compound support are pressed against each other with great force, thus to increase the load-bearing capacity of the compound support. Furthermore, the invention intends to improve nailing plates with respect to their retention in the beams, with extensive elimination of a bursting effect exerted by the nails on the wooden parts. Additional improvements aim at a possibility for affixing nailing plates to the connecting site before the plates are subjected to the final pressing-in step.

It is also an object of the invention, in the manufacture of compound supports using the nailing plates of this invention, to account for the stress conditions that occur, by means of an appropriate arrangement of the nailing plates.

SUMMARY OF THE INVENTION

The essential feature of the nailing plate of this invention, of the type discussed in the introduction, resides in that the nailing plate and, respectively, its effective zone equipped with nails, has the outer contour of a rhomboid or a rhombus, and all, or at least the majority of the nails, are oriented with respect to one another in parallel and obliquely to the butt joint located between the beam layers. The contour configuration of the nailing plates and/or of their effective area in the form of a rhomboid or rhombus, in interaction with the oblique positioning of the nails (and/or of the majority of nails) with respect to the butt joint between the beams, results in increased compression and thus compound connecting action of the supports, while extensively avoiding an expanding effect on the wood of the beams to be joined.

The expanding action is additionally also reduced by the provision of one or several nail-free zones at the butt joints of two or more beam layers. At the same time, weakening of the nailing plate by punched-in portions is thereby avoided at the location of its maximum stressing in the zone of the butt joint. A further improvement in this direction results from the fact that the nails in respectively one nail row are arranged in a zig-zag pattern by punchings extending in alternating directions.

A prerequisite for obtaining the effect desired by the invention, namely improvement of the load-bearing capacity of compound supports, is an exact mounting of the nailing plates with respect to the butt joint as well as in the longitudinal direction of the supports, in correspondence with the stress, normally bending stress, to which the supports are subjected. The invention, for this purpose, provides that, among nails conventionally exhibiting differing lengths, only one or two or three nails are made to be longer than the remaining nails. The longer configuration of only individual nails affords the possibility of tacking the nailing plate, by single hammer blows, to exactly the desired location at the beams. In this connection, it is expedient to arrange the longer nail or nails in corner zones of the nailing plate. In case two longer nails are formed, these are arranged in mutually diagonal opposition with respect to the nailing plate. Three longer nails are located, according to the invention, in the region of the narrow sides of the rhomboid-shaped nailing plate or of its effective region, preferably two nails in the corner zones of one narrow side, and the third nail in the zone of the center of the other narrow side.

A special strength property of compound supports is achieved with the aid of the nailing plates of this invention by arranging right-hand and left-hand nailing plates, fashioned in mirror-image symmetry to each other, in an alternating pattern preferably in groups and/or in pairs in correspondence with the load exerted on the compound support, distributed over the length of the latter. In zones of higher stress, the nailing plates are set in greater proximity to one another, which is facilitated by their rhomboid- or rhombus-shaped outer contour.

BRIEF DESCRIPTION OF THE DRAWING

Details of the invention will be described with reference to the drawing which schematically illustrates embodiments for the nailing plates of this invention and the compound supports produced thereby, in a way which is not limiting. In the drawing:

FIG. 1 shows a lateral view of a compound support, the beams of which are connected with each other by means of rhomboid nailing plates according to the invention, FIG. 1A shows the use of rhombus nailing plates, FIG. 2 shows, in an enlarged representation, a top view of one embodiment of a nailing plate according to the invention, FIG. 2a shows a single nail in an elevational view, FIG. 3 shows another embodiment of a nailing plate according to the invention, and FIG. 4 shows still another embodiment of a nailing plate according to the invention.

DESCRIPTION OF THE PREFERRED EMBODIMENTS

According to FIG. 1, a compound support is composed of two beams 5, pressed together by means of nailing plates 1 at the butt joint 4 and being joined together to a load-bearing unit. The nailing plates 1 exhibit a rhomboid-shaped contour, it being assumed that the ends of the compound support are stressed more than its longitudinal center and accordingly the nailing plates 1 are grouped more densely at the ends of the support.

FIG. 2 shows a nailing plate 1 and FIG. 2a shows a single nail 2, vertically forced out of a tongue-shaped punched-in portion 21, in an enlarged view. The nailing plate 1 consists of a sheet-metal plate 11. A nail-free zone 9 is provided between the nails 2, arranged in rows, in correspondence with the butt joint 4 indicated by a dashed line. All of the nails 2 are oriented in the same direction and arranged obliquely to the butt joint 4. The essential feature herein is that the nails 2 of a row of nails are located in a zig-zag pattern by punchings 21 made in an alternating direction. The expansion effect on the beams 5 to be joined is reduced, on the one hand by the oblique location of the nails 2, on the other hand by their zig-zag position in a row, but at the same time a uniform and dense distribution of the nails 2 is achieved over the surface of the nailing plate 1. This contributes toward a high strength of the connection of the beams 5 into a compound support (pressed beam).

The nailing plate 1 illustrated in FIG. 3 in a top view consists, just as the nailing plate 1 described with reference to FIGS. 2 and 2a, of a metal sheet 1 from which nails 2 having a tongue-like configuration have been forced by means of punched-in portions 21. These nails 2 have all identical length. Additionally, longer nails 3 are provided, formed by punchings 31 of the metal sheet 11. In case of relatively small nailing plates 1, a single longer nail 3, in case of relatively large nailing plates 1, two or three longer nails 3 can be provided. Two longer nails 3, as illustrated in FIG. 3, are here located in mutually diagonal opposition in the corner zones of the rhomboid-shaped nailing plate 1.

If three longer nails 3 are included, two of these are located on a narrow side of the nailing plate 1, the third nail lying on the opposite narrow side approximately in the center thereof. The arrangement of longer nails 3, as contrasted with the equal-length, shorter nails 2, makes it possible to tack a nailing plate to a desired location by means of one, two, or three hammer blows at the longer nails for retaining the nailing plates 1 before they are driven in place mechanically by press tools. Also in the nailing plate 1 according to FIG. 3, a nail-free zone 9 is provided along a butt joint 4.

The invention likewise covers nailing plates wherein the sheet-metal plates 11 have a contour other than rhomboid-shaped (for example a rectangular or square contour), and wherein the nails 2, 3 are arranged in a rhomboid- or rhombus-like area ("effective area"). In this connection, individual nails, for example tacking nails fashioned to be longer similarly to the nails 3, can also be located outside of the effective area.

The illustrated and described embodiments of the nailing plate of this invention serve merely for explaining the basic aspect of the invention, without limiting the latter to details. Thus, in addition to the nails 2 and 3, aligned in parallel with respect to one another, it is also possible to arrange several nails having a different orientation in the nailing plate 1 and/or in the effective area 7 of the nailing plate 6. However, it is preferred in this invention to orient all of the nails in parallel to one another, as illustrated in the figures.

I claim:

1. In a nailing plate comprising a sheet-metal plate having a first parallel pair of edges and a second parallel pair of edges interconnecting said first parallel pair of edges, a plurality of nails extending from said sheet-metal plate, said plurality of nails being formed from parallel tongue-shaped perforations effected in said sheet-metal plate, said sheet-metal plate further comprising a central imperforate zone extending along an axis parallel to said first parallel pair of edges, all said parallel tongue-shaped perforations being inclined relative to said axis and evenly distributed on opposite sides of said imperforate zone; the improvement in which said second parallel pair of edges of said sheet-metal plate is inclined relative to said first parallel pair of edges, and all said parallel tongue-shaped perforations are parallel to said second parallel pair of edges of said sheet-metal plate.

2. Nailing plate according to claim 1, wherein said plurality of nails extend from alternately opposite ends of said tongue-shaped perforations, whereby said plurality of nails have a zig-zag configuration.

* * * * *